(12) United States Patent
Galehr et al.

(10) Patent No.: US 12,168,482 B2
(45) Date of Patent: Dec. 17, 2024

(54) STEERING COLUMN FOR A MOTOR VEHICLE WITH ROTATION LIMITATION

(71) Applicants: thyssenkrupp Presta AG, Eschen (LI); thyssenkrupp AG, Essen (DE)

(72) Inventors: Robert Galehr, Schaanwald (LI); Gerald Reiter, Elsbethen (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 369 days.

(21) Appl. No.: 17/636,618

(22) PCT Filed: Aug. 11, 2020

(86) PCT No.: PCT/EP2020/072442
§ 371 (c)(1),
(2) Date: Feb. 18, 2022

(87) PCT Pub. No.: WO2021/032526
PCT Pub. Date: Feb. 25, 2021

(65) Prior Publication Data
US 2022/0281511 A1   Sep. 8, 2022

(30) Foreign Application Priority Data
Aug. 20, 2019 (DE) .................... 10 2019 122 320.2

(51) Int. Cl.
*B62D 5/00* (2006.01)
*B62D 1/16* (2006.01)

(52) U.S. Cl.
CPC .............. *B62D 5/001* (2013.01); *B62D 1/16* (2013.01)

(58) Field of Classification Search
CPC .................................. B62D 5/001; B62D 1/16
(Continued)

(56) References Cited

U.S. PATENT DOCUMENTS 6,854,355 B2 * 2/2005 Schulz ................... B62D 1/184
                                                      280/775
8,074,763 B2 * 12/2011 Hung ....................... B62D 5/09
                                                      180/417
(Continued)

FOREIGN PATENT DOCUMENTS

CN      108082274 A      5/2018
DE      100 17 049 A1   11/2000
(Continued)

OTHER PUBLICATIONS

Monimoy et al., "Torque Based Lane Change Assistance with Active Front Steering," 2017, Publisher: IEEE.*
(Continued)

*Primary Examiner* — Tuan C To
(74) *Attorney, Agent, or Firm* — thyssenkrupp North America, LLC

(57) ABSTRACT

A steering column for a motor vehicle comprising a steering shaft that is mounted rotatably in a steering shaft bearing unit and a rotation limitation device that is configured to limit rotation of the steering shaft. The rotation limitation device may have a slotted guide carrier that is fastened to one end of the steering shaft and a spiral slotted guide track. A sliding block may be guided movably in the slotted guide track. The sliding block may be fastened to a lever that is held tiltably on the steering shaft bearing unit and that has a counterstop that can be brought into operative engagement with a stop component that is fastened to the steering shaft, for limiting rotation of the steering shaft.

20 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 9,522,693 | B2* | 12/2016 | Tomaru | .................. F16B 2/185 |
| 10,202,139 | B2* | 2/2019 | Tanaka | .................. B62D 1/185 |
| 10,640,141 | B2* | 5/2020 | Kwon | ..................... B62D 1/189 |
| 10,717,457 | B2* | 7/2020 | Dubay | ..................... B62D 1/19 |
| 2003/0184072 | A1 | 10/2003 | Andonian | |
| 2008/0202275 | A1 | 8/2008 | Rouleau et al. | |
| 2012/0144951 | A1* | 6/2012 | Minamigata | ........... B62D 1/195 74/492 |
| 2013/0160595 | A1* | 6/2013 | Moriyama | ............. B21D 53/88 74/493 |
| 2013/0220725 | A1 | 8/2013 | Ishihara | |
| 2014/0209403 | A1* | 7/2014 | Ogi | .......................... B62D 5/04 180/280 |
| 2015/0096404 | A1* | 4/2015 | Martinez | ................ B62D 1/189 74/492 |
| 2015/0367878 | A1* | 12/2015 | Tanaka | .................. B62D 1/184 74/493 |
| 2016/0009312 | A1* | 1/2016 | Pfeiffer | ................. B62D 5/006 74/395 |
| 2017/0242440 | A1* | 8/2017 | Nakada | ................ B62D 15/025 |
| 2018/0141585 | A1 | 5/2018 | Kim et al. | |
| 2020/0086908 | A1 | 3/2020 | Forte et al. | |
| 2021/0122406 | A1* | 4/2021 | Domig | .................. B62D 1/184 |
| 2021/0129898 | A1 | 5/2021 | Forte et al. | |
| 2021/0197882 | A1* | 7/2021 | Bayer | .................... B62D 1/183 |
| 2021/0285498 | A1* | 9/2021 | Sulser | ................... F16C 35/063 |
| 2021/0293273 | A1* | 9/2021 | Huber | ...................... B62D 1/16 |

FOREIGN PATENT DOCUMENTS

| | | | | |
|---|---|---|---|---|
| DE | 10 312 516 A1 | 10/2003 | | |
| DE | 10 2008 045 195 A1 | 3/2010 | | |
| DE | 10 2013 014 138 B3 | 12/2014 | | |
| DE | 10 2017 206 276 A1 | 10/2018 | | |
| DE | 10 2017 209 664 A1 | 12/2018 | | |
| EP | 3 476 692 A1 | 5/2019 | | |
| GB | 2289658 A | * | 11/1995 | ......... B60R 25/0222 |
| GB | 2387429 A | * | 10/2003 | ............... B62D 1/16 |
| JP | H03124057 U | 12/1991 | | |
| JP | 2003048550 A | 2/2003 | | |
| JP | 2005262974 A | 9/2005 | | |
| JP | 2013063745 A | 4/2013 | | |
| JP | 2015-098-222 A | 5/2015 | | |
| JP | 2016008011 A | 1/2016 | | |
| WO | 2010/023292 A1 | 3/2010 | | |

OTHER PUBLICATIONS

English Translation of International Search Report issued in PCT/EP2020/072442, dated Oct. 20, 2020.

* cited by examiner

STEERING COLUMN FOR A MOTOR VEHICLE WITH ROTATION LIMITATION

CROSS REFERENCE TO RELATED APPLICATIONS

This application is a U.S. National Stage Entry of International Patent Application Serial Number PCT/EP2020/072442, filed Aug. 11, 2020, which claims priority to German Patent Application No. DE 10 2019 122 320.2, filed Aug. 20, 2019, the entire contents of both of which are incorporated herein by reference.

FIELD

The present disclosure generally relates to steering columns, including steering columns for motor vehicles that have rotation limitation devices for limiting rotation of steering shafts.

BACKGROUND

Steering columns are preferably used in the case of steer-by-wire steering systems, in the case of which there is no direct mechanical coupling between the steering wheel or the steering shaft and the steering linkage, and the motor vehicle wheels are moved directly with the aid of a servomotor which is a constituent part of the feedback actuator. The maximum lock angle of the steering wheel is therefore no longer defined via mechanical stops in the steering gear. The maximum steering angle lock of the wheels is nevertheless limited in steer-by-wire systems, however. Therefore, an indication of when a maximum steering lock is reached is to be given to the driver. In the simplest case, a mechanical steering stop can be used which limits the maximum lock angle of the steering wheel to a certain angle.

Laid-open specification DE 10 312 516 A1 has disclosed a steering column with a mechanical rotation limitation means. The rotation limitation means has two disks with in each case a spiral track, a ball being arranged between the spiral tracks. In the case of the steering shaft rotation, the ball moves in the spiral tracks. A disadvantage of this solution is the high vulnerability to tolerances. The balls can rattle in the spiral tracks and, in the case of improper use, the rotation limitation means can jam, with the result that the steering of the motor vehicle is impaired.

Thus, a need exists to specify a steering column for a motor vehicle with an improved rotation limitation means which ensures reliable operation and has a low rattling tendency.

DETAILED DESCRIPTION

Figure 1:
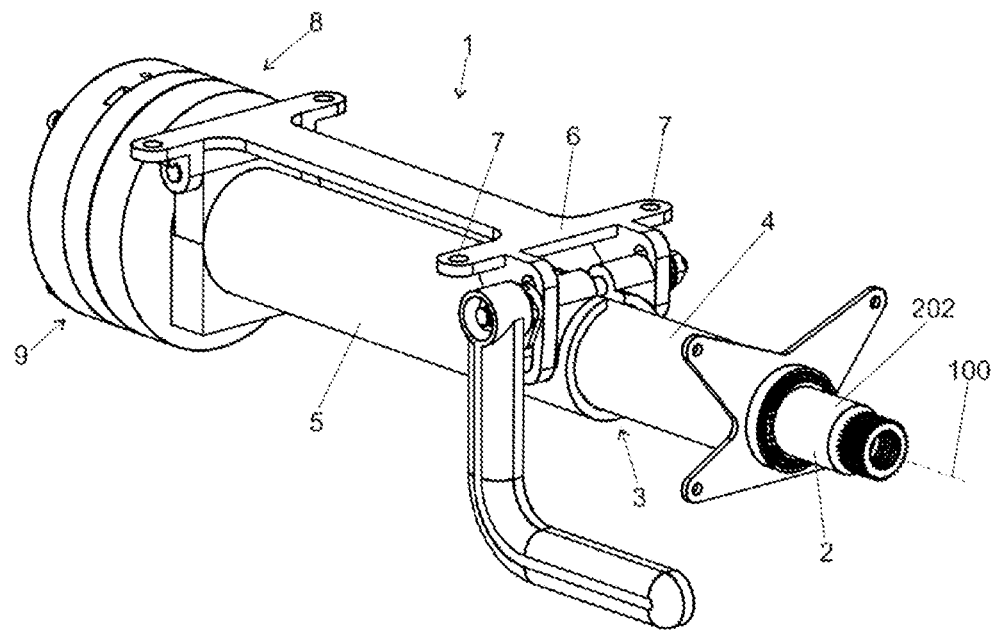
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering column for a motor vehicle comprising a steering shaft which is mounted rotatably in a steering shaft bearing unit, and a rotation limitation device which is set up to limit a rotation of the steering shaft are provided, the rotation limitation device having a slotted guide carrier which is fastened to one end of the steering shaft and has at least one spiral slotted guide track, and a sliding block being guided movably in the at least one slotted guide track, and the sliding block being coupled to a lever which is held tiltably on the steering shaft bearing unit and which has at least one counterstop which can be brought into operative engagement with a stop component which is fastened to the steering shaft, for rotation limitation of the rotation of the steering shaft.

Reliable operation of the rotation limitation device is ensured by way of the provision of a stop. In addition, the occurrence of rattling noise can be avoided.

It is advantageous if the slotted guide carrier is coupled to the steering shaft in a torque-proof manner. The slotted guide carrier is particularly preferably arranged on an inner shaft of the steering shaft. The slotted guide carrier is preferably configured as a disk, the spiral slotted guide track being placed on an upper side. The spiral slotted guide track is preferably groove-shaped or channel-shaped.

The steering shaft preferably comprises an outer shaft, in which an inner shaft is received displaceably, the outer shaft being coupled to the inner shaft in a torque-proof manner, preferably with a sleeve which is preferably formed from plastic being connected in between. The inner shaft can be configured as a solid shaft or as a hollow shaft. One end of the steering shaft has a coupling section which can be coupled to a steering handle (also called a steering wheel) in a torque-proof manner.

The steering shaft bearing unit is preferably configured as a casing tube or a guide bracket. The steering shaft bearing unit can preferably be connected to the motor vehicle directly or indirectly, with one or more casing tubes and/or a mounting bracket being connected in between.

The stop component is preferably arranged on that side of the slotted guide carrier which is remote from the slotted guide track, and has a cylindrical main body with at least one projection which configures a stop. The projection preferably extends in the radial direction with respect to the longitudinal axis of the steering shaft. A side face of the projection preferably configures the stop.

In one preferred embodiment, the slotted guide carrier has two spiral slotted guide tracks, a sliding block being guided displaceably in each of the two slotted guide tracks, which sliding block is fastened in each case to a lever, and the two levers being held tiltably on the steering shaft bearing unit. Here, the levers can limit the rotation of the steering shaft in the same or opposite directions.

It can also be provided that a lever has two counterstops, each of which can be brought into operative engagement with the stop component only in one rotational direction in such a way that the rotation of the steering shaft is limited in the two directions. For the case where two levers are provided, the rotation of the steering shaft is therefore limited in the two directions by the two levers. A redundancy can be provided thanks to this measure. Moreover, even relatively high torques which are introduced into the steering shaft in the lock situation can be supported. Therefore, undesired damage of the rotation limitation device in the case of improper use can be prevented.

The two levers preferably lie opposite one another in the circumferential direction around the steering shaft. The levers and the slotted guide track are configured in such a way that the two levers can be brought into operative engagement by way of their counterstop with in each case one stop of the stop component at the same rotational angle of the steering shaft. The two levers are therefore a redundant system. The force which occurs in the case of the steering lock can be distributed by way of the provision of two levers, with the result that a more stable rotation limitation device can be provided.

The stop component preferably has two projections with in each case two stops which lie opposite one another, with the result that the rotation of the steering shaft is limited for the two levers in each case in the two directions.

In one preferred embodiment, the sliding block is configured as a pin-shaped element. It is advantageous here if the pin-shaped element is configured with the lever and the counterstops as a single-piece integral component.

A damping body is preferably arranged on the stops of the stop component and/or the counterstops, in order to damp contact. The damping body is preferably formed from a plastic and/or an elastomer. Thanks to this measure, the haptic and acoustic properties of the rotation limitation device can be improved further.

The steering column is preferably provided for a steer-by-wire steering system of a motor vehicle. The steering shaft can preferably be coupled to a manual torque actuator (feedback actuator) which gives feedback about the roadway condition and other influences to the vehicle driver and brings about restoration of the steering shaft into the straight ahead position.

Furthermore, a steer-by-wire steering system of a motor vehicle with an above-described steering column is provided.

In the following text, one preferred embodiment of the invention will be described in greater detail on the basis of the drawings. The same designations are used for identical or functionally identical elements in all the drawings; said designations are therefore generally also named or mentioned only once in the description.

Figure 2:
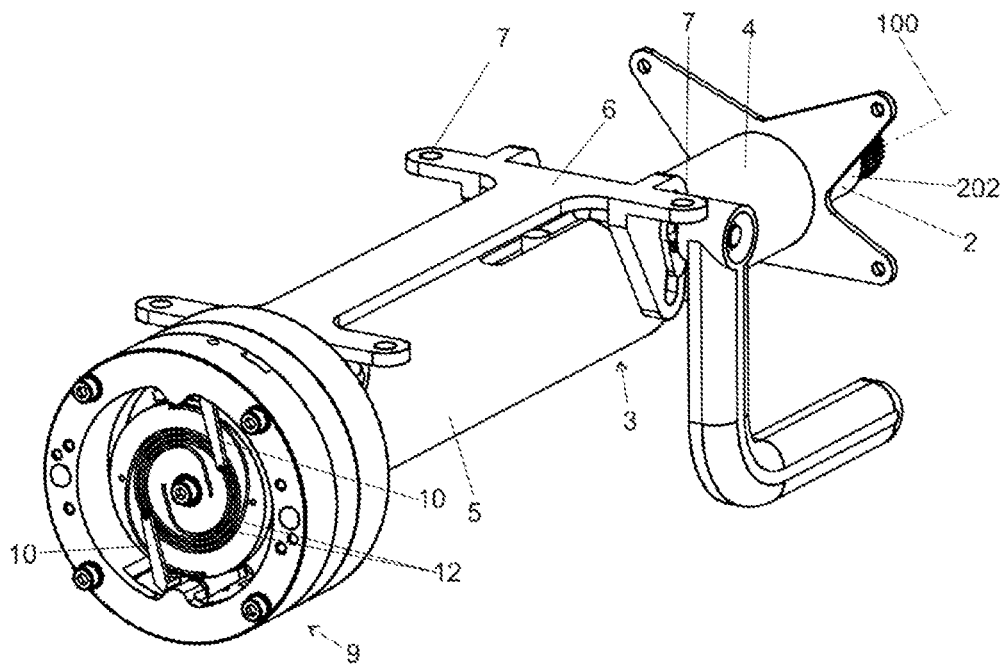
FIG. 2 is a perspective view of the steering column from FIG. 1, showing generally from the top an example rotation limitation device.

FIGS. 1 and 2 illustrate a steering column 1 for a motor vehicle, having a steering shaft 2 which is mounted rotatably about its rotational axis 100 in a steering shaft bearing unit 3, having an inner casing tube 4 and an outer casing tube 5. The inner casing tube 4 is received and guided displaceably in the outer casing tube 5 along the longitudinal axis (synonymous with the rotational axis) of the steering shaft 2. The outer casing tube 5 is mounted in a holding part 6 pivotably about a pivot axis. The holding part 6 can be fastened at fastening points 7 to the body (not shown) of the motor vehicle.

Moreover, the steering column has a fixing device 54 which can be switched over between a released position and a fixed position, the inner casing tube 4 being fixed with respect to the outer casing tube 5 in the fixed position, and the outer casing tube being fixed with respect to the holding part 6 which is configured as a bracket. The above-described adjustment can take place in the released position.

Moreover, the steering column 1 can comprise an energy absorption device which, in the case of a collision due to an accident, absorbs the energy which is input as a result of this and as a result of the vehicle driver impacting on the steering column.

At one end (the rear end), the steering shaft 2 can be connected to the steering wheel (not shown). A feedback actuator 8 which acts on the steering shaft 2 via a gear is arranged at the other end. The feedback actuator 8 comprises an electric motor which surrounds the steering shaft 2 concentrically. It serves to simulate the feedback from the roadway on a steering wheel and therefore to give the driver feedback about the steering and driving behavior of the vehicle.

The steering shaft 2 is preferably telescopic and, in addition to an inner shaft, has an outer shaft 202 which surrounds the inner shaft coaxially. Here, the inner profile of the outer shaft 202 is of complementary configuration with respect to an inner profile of the inner shaft, and permits a transmission of torque. A steering wheel (not shown) can be fastened to the outer shaft 202.

A rotation limitation device 9 is provided at that end of the steering column 1 which is remote from the steering wheel, which rotation limitation device 9 is configured to limit a rotation of the steering shaft 2, that is to say it applies the necessary force in the case of a predefined rotational angle to prevent a rotation of the steering shaft 2.

Figures 3, 4:
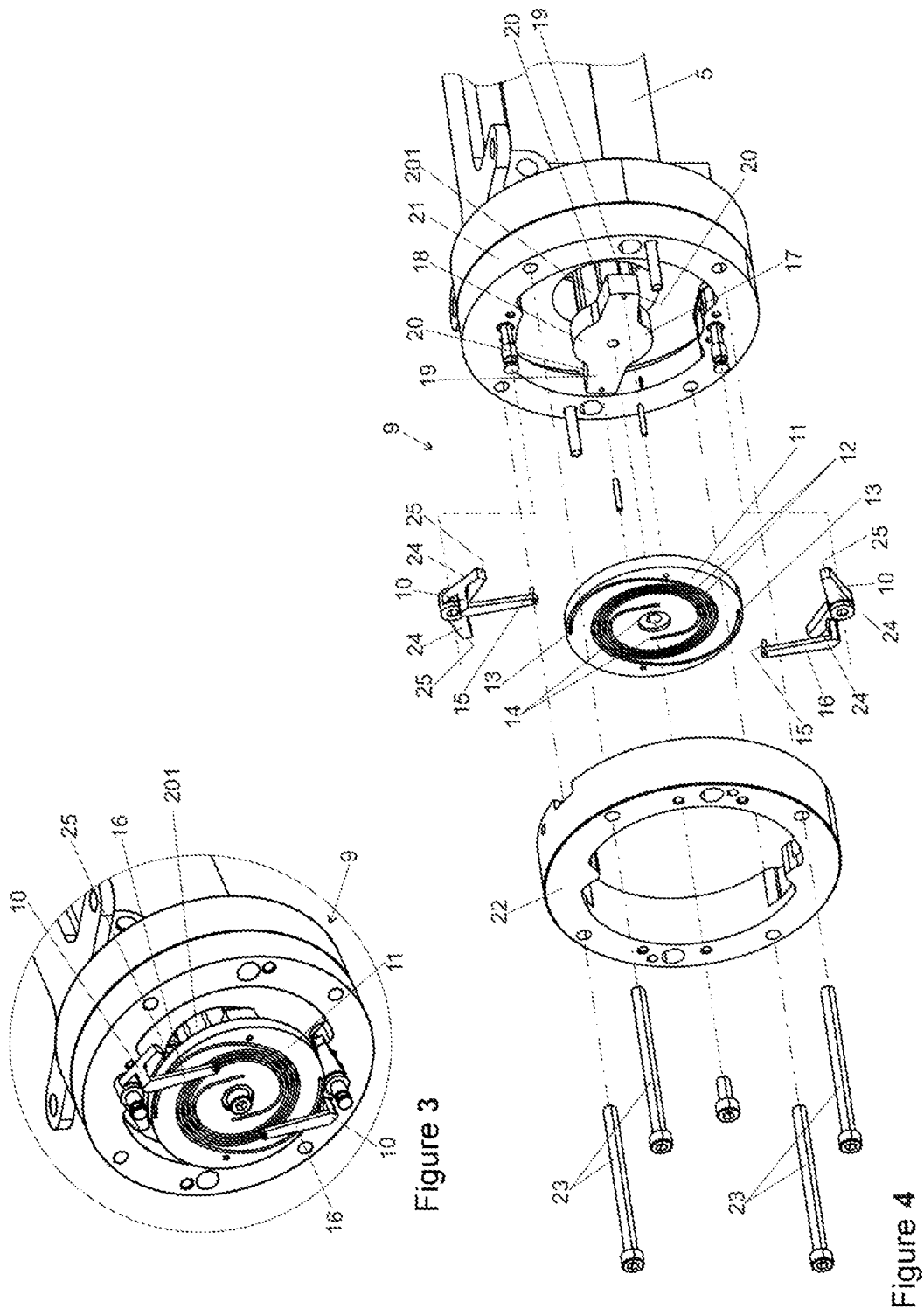
FIG. 3 is a detail view of the rotation limitation device of FIG. 2.
FIG. 4 is an exploded view of a rotation limitation device.
Figure 5:
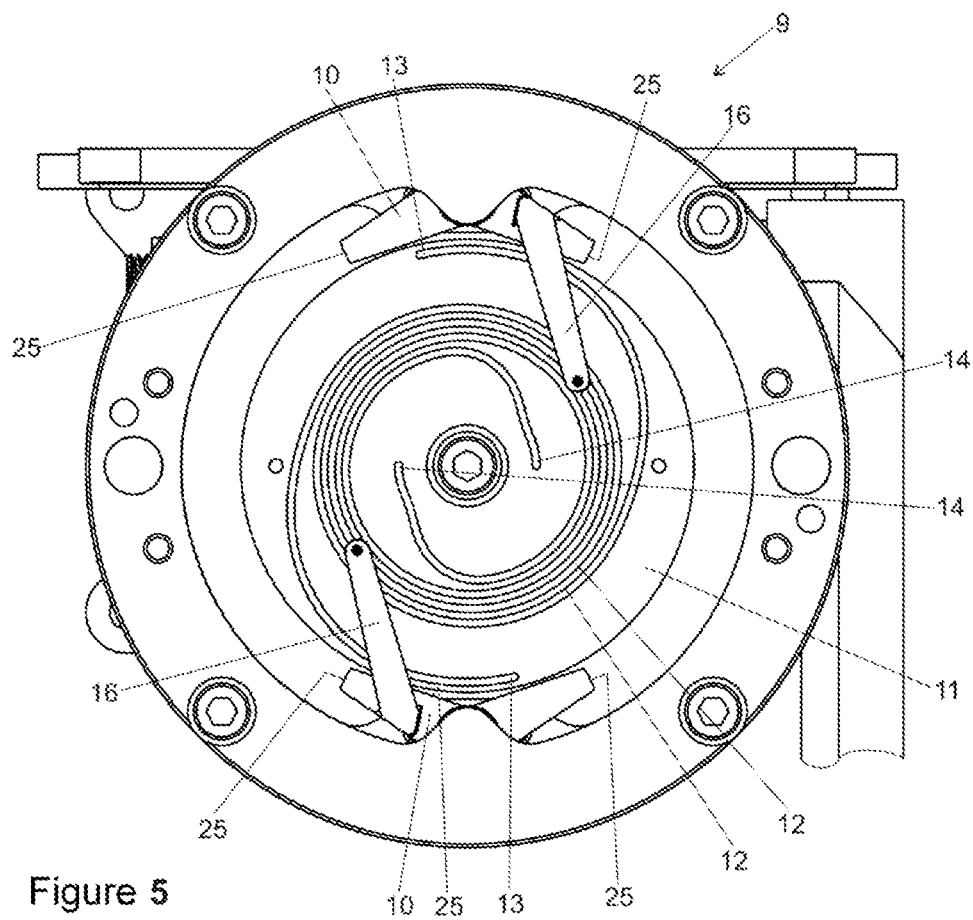
FIG. 5 is a top view of a rotation limitation device in a straight ahead position of a steering wheel.

FIGS. 3 to 5 show the rotation limitation device 9 in detail, a closure cover for covering and sealing having been omitted. It comprises two levers 10 which are fastened pivotably to the outer casing tube 5 and the pivoting movement of which is fixed in each case by way of a spiral slotted guide track 12 which is arranged on a slotted guide carrier 11 which is connected fixedly to the inner shaft 201 for conjoint rotation. The two slotted guide tracks 12 run inside one another, with the result that they do not cross. Each slotted guide track 12 has an outer free end 13 which lies on the outside in the radial direction with respect to the longitudinal axis of the steering shaft 2, and an inner free end 14 which lies on the inside in the radial direction. The radii of the slotted guide tracks 12 change suddenly only shortly before the ends 13, 14; said radius in the end of the slotted guide track is preferably at least twice as great as a radius outside the end region. The end region is defined by the last 30° of the steering angle before the lock situation. The change is particularly preferably at least 30% in a region of 10° of the steering angle before the respective end. The radii of the two slotted guide tracks 12 rise identically toward the outer ends 13, and the radii of the slotted guide tracks 12 decrease correspondingly toward the inner end 14.

The slotted guide carrier 11 is a circular disk which is connected fixedly to the inner steering shaft 201 for conjoint rotation.

The slotted guide tracks 12 are arranged on that end side of the disk which is remote from the steering wheel. They are formed in each case by way of a groove which is made in the end side. In each case one sliding block 15 slides in a slotted guide track 12. The sliding blocks 15 are connected rigidly to the associated lever 10 via a connecting element 16 which is configured as an arm.

FIG. 3 shows the rotation limitation device 9 without a housing part. The two levers 10 lie opposite one another in the circumferential direction around the longitudinal axis of the steering shaft 2, outside but in the relatively immediate vicinity of the slotted guide carrier 11. They in each case have the connecting element 16, on which in each case one sliding block in the form of a pin is held. The sliding block is mounted displaceably in each case in the associated slotted guide track 12. By way of a rotation of the steering shaft relative to the outer casing tube and relative to the slotted guide carrier 11, the sliding block moves in the slotted guide track 12 in such a way that the lever 10 which is connected to the sliding block tilts. The tilting of the levers 10 is predefined in the two rotational directions by way of the cam mechanism which is formed by way of the sliding block and the slotted guide track.

FIG. 4 shows the rotation limitation device 9 in detail. The stop component 17 is seated on the steering shaft 201 at the end which is remote from the steering wheel, which stop component 17 interacts with the lever 10 in such a way that they can be brought into operative engagement with one another and a further rotation of the steering shaft 2 is therefore prevented.

The stop component 17 has a circular main body 18 which is fastened fixedly to the inner shaft 201 concentrically with respect to the latter for conjoint rotation. Two projections 19 which lie opposite one another in the circumferential direction and project to the outside in the radial direction from the main body 18 are arranged in a manner which starts from the main body 18. The two side faces, extending approximately in the radial direction, of each projection 19 configure stops 20 for the lever 10.

The slotted guide carrier 11 is arranged on that end side of the stop component 17 which is remote from the steering shaft. The stop component 17 and the slotted guide carrier 11 are connected fixedly to one another for conjoint rotation. The slotted guide track 12 is arranged on that end side of the slotted guide carrier 11 which is remote from the steering wheel and lies opposite the stop component 17. The stop component 17 and the slotted guide carrier 11 are surrounded on the circumferential side by a housing part 21 which is fastened to the outer casing tube 5. The two levers 10 which lie opposite one another are fastened pivotably to the housing part 21. The levers 10 are held in the axial position thereof by way of a further housing part 22. The two housing parts 21, 22 configure a housing for the rotation limitation device 9, and are connected fixedly to one another by means of fastening means 23 which extend in the longitudinal direction.

The two levers 10 are of identical configuration. A lever 10 has two identical limbs 24 which enclose an angle of approximately 120°. The connecting element 16 is arranged on one of the limbs 24, which connecting element 16 is oriented at an angle of between 25° and 75° with respect to the limb 24 in a plane perpendicularly with respect to the longitudinal axis. A pin 15 is provided as sliding block at the end of the connecting element 16, which pin 15 extends in the longitudinal direction, engages into the slotted guide track 12, and interacts with the latter in the form of a cam mechanism. The lever 10 is mounted on the housing pivotably about a center between the two limbs 24. The slotted guide carrier 11 rotates with the spiral slotted guide track 12 as a result of a rotation of the steering shaft 2. The pin 15 is held movably in the slotted guide track 12. It moves with the rotating track 12, which brings about a pivoting of the lever 10. The two end sides 25 of the limbs 24 of a lever 10 configure counterstops for the stops 20 on the stop component 17, and therefore limit the steering angle.

Figure 6:
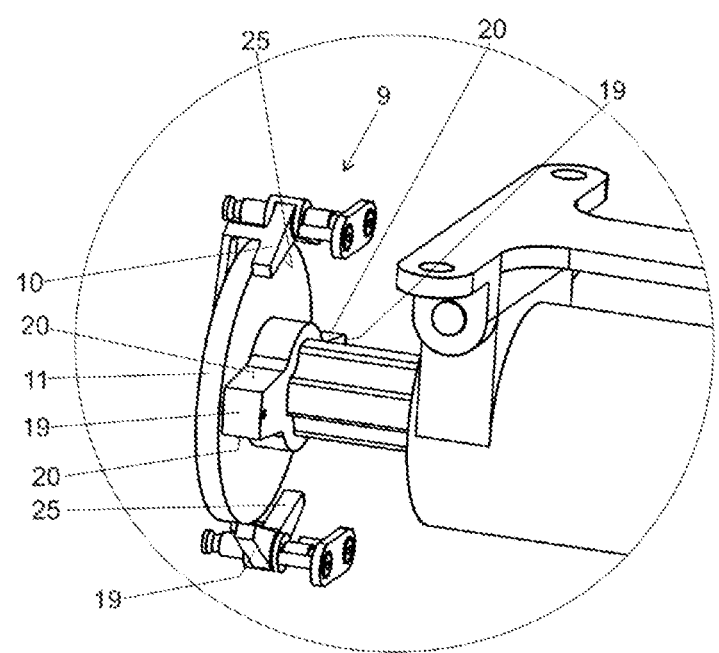
FIG. 6 is a perspective view of components of a rotation limitation device in the straight ahead position of the steering wheel.

FIGS. 5 and 6 show the rotation limitation device 9 in a center position (straight ahead position) of the steering wheel or the steering shaft 2. The two levers 10 are situated in each case centrally in the circumferential direction between the two projections 19 of the stop component 17. The levers 10 are oriented symmetrically in the pivot axis relative to the tangent of the rotational axis. The levers 10 can be pivoted until they come into contact with the counterstops 25 on one side or the other side of the projections 19, the stops 20, and a further rotation is blocked. The steering angle of the steering shaft from the right-hand end lock as far as the left-hand end lock is preferably between 800° and 360°, particularly preferably 630°.

Figure 7:
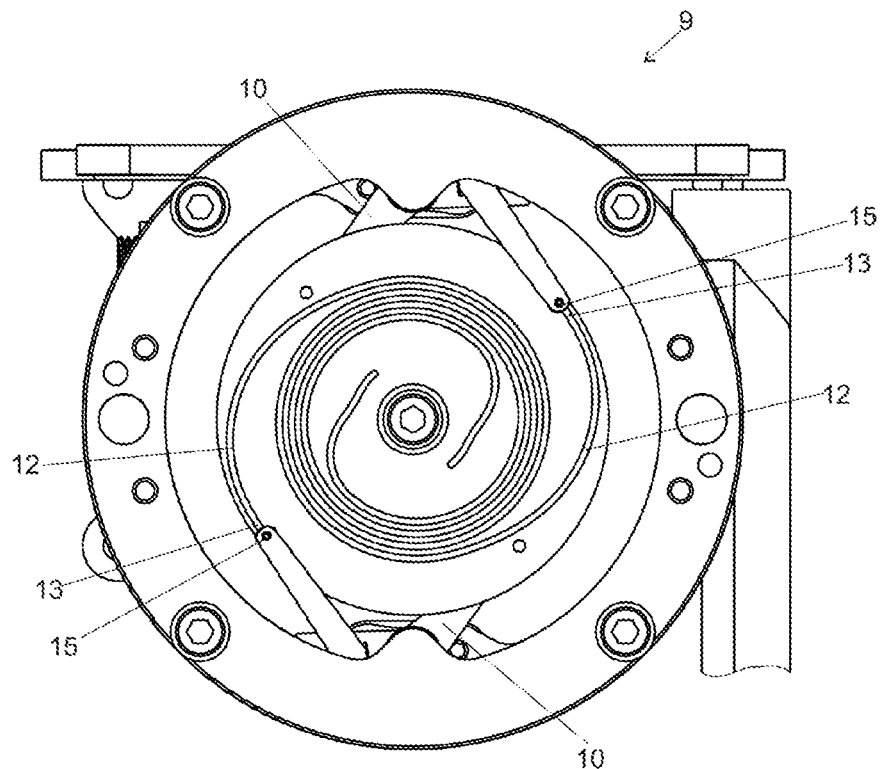
FIG. 7 is a top view of a rotation limitation device at a left-hand lock of the steering wheel.
Figure 8:
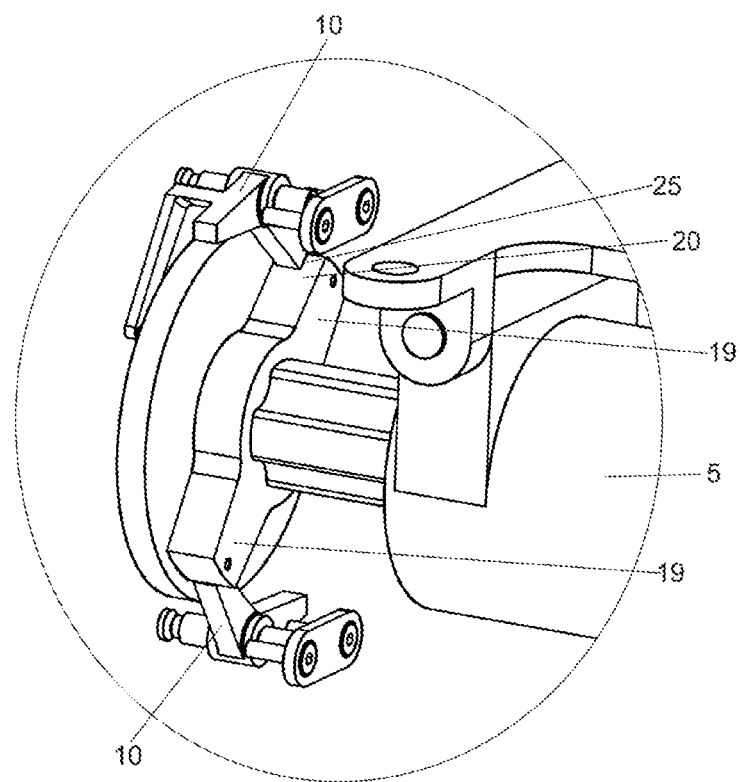
FIG. 8 is a perspective view of components of a rotation limitation device at a left-hand lock of the steering wheel.

FIGS. 7 and 8 show an end lock of the rotation limitation device 9. The end lock which is shown is the lock in the case of the left-hand rotation (also called the left-hand lock). The two sliding blocks 15 are situated at the outer ends 13 of the respective slotted guide track 12. The levers 10 come into contact by way of the counterstops 25 with the stops 20 of the projections 19. Here, the counterstops 25 of the levers 10 lie on opposite sides of the two projections 19. Two levers 10 have the advantage that the system is less susceptible to failures (redundancy), and the force which has to be applied in the case of an end lock is distributed uniformly to the two levers 10.

Figure 9:
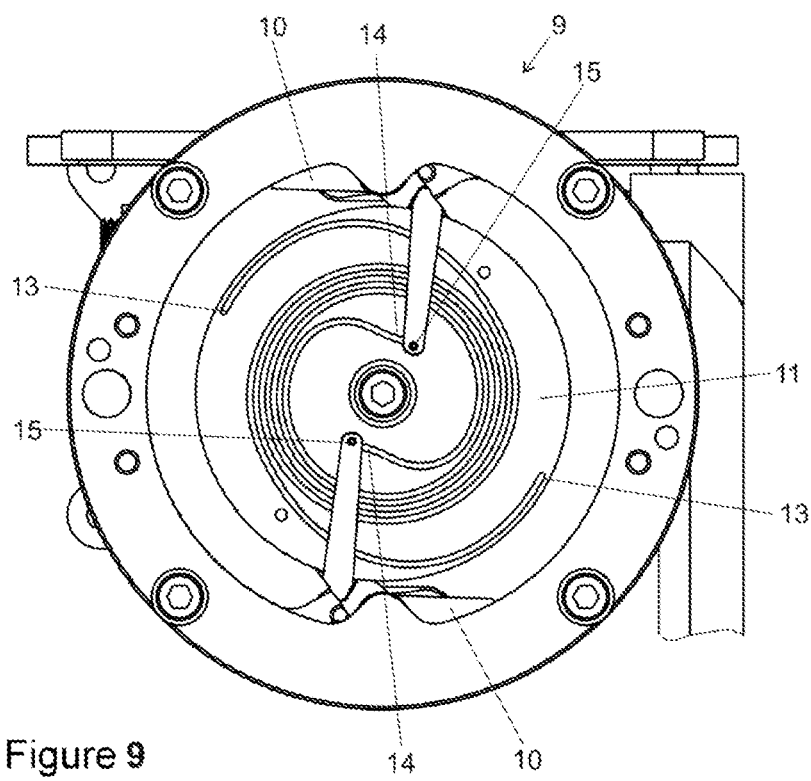
FIG. 9 is a top view of a rotation limitation device at a right-hand lock of the steering wheel.
Figure 10:
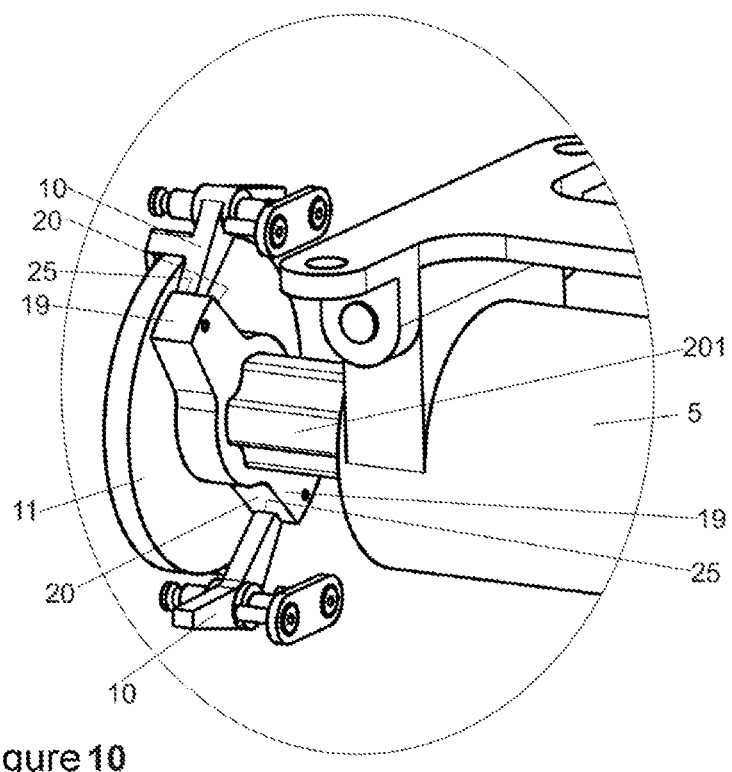
FIG. 10 is a perspective view of components of a rotation limitation device at a right-hand lock of the steering wheel.

FIGS. 9 and 10 show the right-hand lock of the rotation limitation device 9. The two sliding blocks 15 are situated at the inner ends 14 of the respective slotted guide track 12. The levers 10 are in contact by way of their counterstops 25 in each case with a stop 20 of the projections 19. Here, the counterstops 25 of the two levers 10 lie on opposite sides of the two projections 19.

A damping body can preferably be provided which is provided at least on one of the stops and/or the counterstops, in order to dampen contact. A damping body of this type can be formed from a plastic and/or an elastomer.

The rotation limitation device has a low vulnerability to tolerances and smooth low-noise running.

What is claimed is:

1. A steering column for a motor vehicle comprising:
   a steering shaft that is mounted rotatably in a steering shaft bearing unit;
   a rotation limitation device that is configured to limit rotation of the steering shaft, the rotation limitation device including
   a slotted guide carrier that is fastened to a first end of the steering shaft and has a spiral slotted guide track, and
   a sliding block that is configured to be guided movably in the spiral slotted guide track; and
   a lever, wherein the sliding block is coupled to the lever that is held tiltably on the steering shaft bearing unit and that has a counterstop configured to be brought into operative engagement with a stop component that is fastened to the steering shaft, for limiting rotation of the steering shaft;

wherein the stop component is disposed on a side of the slotted guide carrier that is remote from the spiral slotted guide track, wherein the stop component has a cylindrical main body with a projection that configures a stop.

2. The steering column of claim 1 wherein the spiral slotted guide track is a first spiral slotted guide track, the sliding block is a first sliding block, and the lever is a first lever, the slotted guide carrier comprising a second spiral slotted guide track, wherein a second sliding block is configured to be guided movably in the second spiral slotted guide track, wherein the second sliding block is fastened to a second lever that is held tiltably on the steering shaft bearing unit.

3. The steering column of claim 2 wherein the first and second levers are disposed opposite one another in a circumferential direction around the steering shaft, wherein each lever interacts with the respective spiral slotted guide track such that a counterstop of each lever is configured to be brought into operative engagement with a stop of the stop component at a same rotational angle as the steering shaft.

4. The steering column of claim 1 wherein the counterstop is a first counterstop, wherein the lever has a second counterstop, wherein each of the counterstops is configured to be brought into operative engagement with the stop component only in one rotational direction such that rotation of the steering shaft is limited in two directions.

5. The steering column of claim 4 wherein the lever is a first lever, the steering column comprising a second lever, wherein the stop component includes two projections with, in each case, two stops that lie opposite one another, wherein rotation of the steering shaft is limited for the two levers, in each case, in the two directions.

6. The steering column of claim 1 wherein the sliding block is configured as a pin-shaped element.

7. The steering column of claim 6 wherein the counterstop is a first counterstop, wherein the lever has a second counterstop, wherein the pin-shaped element is configured with the lever and the counterstops as a single-piece integral component.

8. The steering column of claim 1 wherein the counterstop is a first counterstop, wherein the lever has a second counterstop, the steering column comprising a damping body that is disposed on stops of the stop component and/or the counterstops.

9. The steering column of claim 8 wherein the damping body is comprised of plastic.

10. The steering column of claim 8 wherein the damping body is comprised of an elastomer.

11. The steering column of claim 8 wherein the damping body is comprised of plastic and an elastomer.

12. A steer-by-wire steering system of a motor vehicle comprising the steering column of claim 1.

13. A steering column for a motor vehicle comprising:
a steering shaft that is mounted rotatably in a steering shaft bearing unit;
a rotation limitation device that is configured to limit rotation of the steering shaft, the rotation limitation device including
a slotted guide carrier that is fastened to a first end of the steering shaft and has a spiral slotted guide track, and
a sliding block that is configured to be guided movably in the spiral slotted guide track; and
a lever, wherein the sliding block is coupled to the lever that is held tiltably on the steering shaft bearing unit and that has a first counterstop configured to be brought into operative engagement with a stop component that is fastened to the steering shaft, for limiting rotation of the steering shaft;
wherein the lever has a second counterstop, wherein each of the counterstops is configured to be brought into operative engagement with the stop component only in one rotational direction such that rotation of the steering shaft is limited in two directions.

14. The steering column of claim 13 wherein the lever is a first lever, the steering column comprising a second lever, wherein the stop component includes two projections with, in each case, two stops that lie opposite one another, wherein rotation of the steering shaft is limited for the two levers, in each case, in the two directions.

15. A steering column for a motor vehicle comprising;
a steering shaft that is mounted rotatably in a steering shaft bearing unit;
a rotation limitation device that is configured to limit rotation of the steering shaft, the rotation limitation device including
a slotted guide carrier that is fastened to a first end of the steering shaft and has a spiral slotted guide track, and
a sliding block that is configured to be guided movably in the spiral slotted guide track; and
a lever, wherein the sliding block is coupled to the lever that is held tiltably on the steering shaft bearing unit and that has a first counterstop configured to be brought into operative engagement with a stop component that is fastened to the steering shaft, for limiting rotation of the steering shaft;
wherein the lever has a second counterstop, the steering column comprising a damping body that is disposed on stops of the stop component and/or the counterstops.

16. The steering column of claim 15 wherein the damping body is comprised of plastic.

17. The steering column of claim 15 wherein the damping body is comprised of an elastomer.

18. The steering column of claim 15 wherein the damping body is comprised of plastic and an elastomer.

19. The steering column of claim 15, wherein each of the counterstops is configured to be brought into operative engagement with the stop component only in one rotational direction such that rotation of the steering shaft is limited in two directions.

20. The steering column of claim 19 wherein the lever is a first lever, the steering column comprising a second lever, wherein the stop component includes two projections with, in each case, two stops that lie opposite one another, wherein rotation of the steering shaft is limited for the two levers, in each case, in the two directions.

* * * * *